United States Patent [19]

McCarty

[11] 4,100,047
[45] Jul. 11, 1978

[54] ULTRAVIOLET CURABLE AQUEOUS COATINGS

[75] Inventor: William H. McCarty, White House Station, N.J.

[73] Assignee: Mobil Oil Corporation, New York, N.Y.

[21] Appl. No.: 731,144

[22] Filed: Oct. 12, 1976

[51] Int. Cl.$^2$ .............................. C08F 2/50; C08F 4/00
[52] U.S. Cl. .............................. 204/159.23; 96/115 P; 260/29.6 R; 260/29.6 MN; 428/522
[58] Field of Search ................ 204/159.23; 96/115 P; 260/29.6 MN, 29.6 R, 29.6 NR

[56] References Cited

U.S. PATENT DOCUMENTS

| | | | |
|---|---|---|---|
| 3,901,779 | 8/1975 | Mani | 204/159.23 X |
| 3,914,165 | 10/1975 | Gaske | 204/159.23 X |
| 3,926,641 | 12/1975 | Rosen | 204/159.23 X |
| 4,004,998 | 1/1977 | Rosen | 204/159.23 X |
| 4,022,674 | 5/1977 | Rosen | 96/115 P X |

*Primary Examiner*—Walter C. Danison
*Attorney, Agent, or Firm*—Charles A. Huggett; Michael G. Gilman; Mitchell G. Condos

[57] ABSTRACT

Ultraviolet curable aqueous coating solutions are provided in which an hydroxy functional ethylenically unsaturated material, such as hydroxy ethyl acrylate or a polyether or polyester thereof, is dissolved in water with the aid of an amine photoinitiator and a photosensitizer is incorporated in the composition, preferably by reacting the hydroxy functionality in the ethylenically unsaturated material with a tetracarboxylic acid dianhydride including a proportion of benzophenone tetracarboxylic dianhydride which provides the needed ultraviolet photosensitizer.

12 Claims, No Drawings

ULTRAVIOLET CURABLE AQUEOUS COATINGS

The present invention relates to water solution coating compositions capable of curing on ultraviolet light exposure, and particularly to compositions in which either the photosensitizer or the photoinitiator, and preferably both, are directly incorporated into the cured coating so as to better resist loss by volatilization or extraction.

In accordance with this invention, an hydroxy functional ethylenically unsaturated ultraviolet curable material is reacted with a polycarboxylic acid and preferably an anhydride thereof to provide pendant carboxyl groups enabling dispersion in water with the aid of an amine which serves as the photoinitiator. In preferred practice, the polycarboxylic acid anhydride is selected to provide the photosensitizer and the amine may be ethylenically unsaturated so that these components become chemically coupled with the ultraviolet curable material upon exposure to ultraviolet light.

The hydroxy functional ethylenically unsaturated ultraviolet curable material may vary considerably in this invention. In conventional practice, the ultraviolet curable material is a liquid of coating viscosity and this creates a situation where this material includes volatile and/or toxic materials. It is desirable to provide as much resinification as possible in order to minimize volatility or toxicity, but this is inconsistent with the fluidity needed for coating application, and also with the desire to substantially eliminate volatile organic solvents.

In this invention greater resinification is permitted because of dispersion in water, and this permits the problem of volatile and toxic ethylenically unsaturated materials to be avoided independently of the selection of the material.

The ethylenically unsaturated ultraviolet curable material may be monoethylenic or polyethylenic, the preferred unsaturation being acrylic because acrylic unsaturation exhibits an excellent ultraviolet cure. Similarly, the ultraviolet curable material may be monohydric or polyhydric and the molecular weight may be low enough to provide a fluid liquid, or high enough to provide a solid or viscous semi-solid.

When the molecular weight is sufficient to provide a resinous body, as in epoxy resin diacrylates which are polyhydric, the polycarboxylic acid anhydride is preferably a monoanhydride, such as trimellitic anhydride, glutaric anhydride or maleic anhydride. On the other hand, when the molecular weight of a polyethylenic material is low (normally liquid) or when the radiation curable material is monoethylenic, then dianhydrides can be used to increase both molecular weight and ethylenic functionality. Thus, hydroxy ethyl acrylate can be reacted with an approximately stoichiometric proportion of tetracarboxylic acid dianhydride, such as pyromellitic dianhydride to form dicarboxylic diacrylate diesters. The stoichiometry is between the anhydride group and the single hydroxy group in the hydroxy acrylate, and it can vary ± 20%. If desired, polyhydric materials can be advanced in molecular weight by reaction with a small amount of organic polyisocyanate, like toluene diisocyanate, at the expense of some of the hydroxy functionality.

Other ethylenically unsaturated ultraviolet curable materials are illustrated by pentaerythritol triacrylate, hydroxy propyl acrylate, and unsaturated hydroxy functional polyesters containing maleic acid or anhydride. The acrylates can be replaced by methacrylates, norbornenes, and the like.

The dianhydride which is preferred in this invention is benzophenone tetracarboxylic dianhydride since this not only allows an increase in ethylenic functionality, but it introduces a ketonic photosensitizer which is chemically united to the ethylenically unsaturated material so that it becomes an integral part of the final cured product. In preferred practice using monoacrylates, the benzophenone dianhydride will provide from 5% – 40%, preferably from 8% – 20%, of the anhydride functionality.

The reaction between the hydroxy functional ethylenically unsaturated material and the anhydride is a simple addition reaction which is fostered by moderate heat (30°–150° C.) and a small amount (0.2-3%) of a basic catalyst (typically a tertiary amine, such as triethyl amine). A trace of a polymerization inhibitor, such as benzoquinone, may also be present to minimize inadvertent polymerization.

The reaction with the anhydride is easily followed by observing the acid number decrease as the reaction proceeds.

While the anhydride can react by addition without causing any reaction with carboxyl functionality, the acid itself can be used, e.g., a phthalic acid or mellitic acid, but it is difficult to stop the reaction with only one ester group per molecule, so the use of anhydride is much preferred. Also, milder reaction conditions are used which helps to avoid polymerization.

The proportion of polycarboxylic acid or anhydride thereof can vary considerably. Generally, one starts with an ethylenically unsaturated hydroxy functional material which is poorly soluble in water, and the reaction with anhydride introduces carboxyl functionality which permits dispersion in water with the aid of a base, preferably an amine. All that is required is to use enough anhydride to enable water dispersibility, preferably water solubility. On this basis, a final acid number of from 20-300, preferably from 60-200, is adequate to provide the desired result.

It is not desired to introduce a large amount of water. Resin solids contents of at least 40%, preferably at least 60%, are contemplated herein. Of course, these solutions may be pigmented as desired, dyed, and they may include diverse materials such as wetting agents, flow control agents, and even dissolved or suspended resins which are not unsaturated, including aminoplast resins such as hexamethoxy methyl melamine, to enable a subsequent thermal cure.

The acidic material produced as previously noted is associated with water with the aid of a base which is preferably an amine, such association being itself entirely conventional. Enough base is used to provide the desired dispersion, and this will vary depending upon the acid number and the particle size desired in the usually colloidal solutions which are produced. A pH of from 6.0 – 11.0 are generally contemplated, preferably a pH of from 7.5 – 10.5.

The point to be observed is that the amine which is used to neutralize the acidity of the unsaturated material provides both water dispersibility and photoinitiation. The photoinitiator effect of amines, and especially tertiary amines such as dimethyl ethanol amine, is well known.

A feature of this invention is to employ an ethylenically unsaturated amine, preferably a tertiary amine, to provide the dual function noted above. Preferred unsaturated amines are illustrated by dimethylamino ethyl acrylate, but the methyl groups can be replaced by other lower ($C_1$ - $C_4$) alkyl groups and the ethyl acrylate can be replaced by propyl or butyl acrylate or the corresponding methacrylates. This provides a photoinitiator which polymerizes on ultraviolet exposure so as to better resist removal by volatilization or extraction.

This invention particularly contemplates water solutions of high solids content, and these are provided by employing liquid monoethylenically unsaturated hydroxy functional polyethers, preferably those made by reacting several moles of propylene oxide with acrylic acid or hydroxyethyl acrylate.

The liquid monoethylenically unsaturated hydroxy functional polyethers which are preferably used herein are more fully disclosed in the application of Marvin L. Kaufman, Ser. No. 618,101, filed Sept. 30, 1975. As described in that application, a monoethylenic carboxylic acid or hydroxy ester thereof, and especially acrylic acid or hydroxy alkyl acrylate such as hydroxy ethyl acrylate, is reacted with enough alkylene monooxide (preferably propylene oxide) in the presence of a Lewis acid catalyst such as boron trifluoride etherate, to produce an hydroxy functional polyether, preferably containing an average of 2–10 ether groups per molecule. This invention will be illustrated by a polyether formed by adducting an average of 5 moles of propylene oxide onto one mole of hydroxyethyl acrylate, all of the hydroxy functional products provided in the disclosure of said application Ser. No. 618,101 being useful herein, and the disclosure of that application is hereby incorporated by reference.

The invention is illustrated in the following examples.

EXAMPLE 1

Charge a dry reaction vessel fitted with a stirrer, thermometer, condenser, drying tube and two additional funnels with 928g hydroxyethyl acrylate (8.8 moles). Add enough boron trifluoride etherate to initiate the reaction, approximately 1 ml. Then, with suitable cooling, add 2320g propylene oxide (40.0 moles) and additional $BF_3$ etherate (15–20 ml.) at such a rate so as to maintain reaction temperature at 50° C. Total addition time is 2–2.5 hours. Maintain the temperature as high as possible by decreasing cooling. When the temperature drops to about 40° C., sample the reaction for gas chromatography. When gas chromatography shows no propylene oxide, add 0.32g hydroquinone (100 parts per million) and 2 ml. triethylamine to stabilize the product. The product is a clear, light yellow liquid of 35–40 centipoise viscosity. A complete gas chromatography analysis indicates the product is a mixture of hydroxyethyl acrylate (~2%) and adducts thereof having the formula shown below in which $x$ ranges from 1 to about 10, and has an average value of 5. NMR analysis of the product shows the correct ratio of vinyl protons to the remaining types of protons and infrared analysis shows the presence of hydroxyl, acrylate unsaturation and ether bands, all consistent with the following structure:

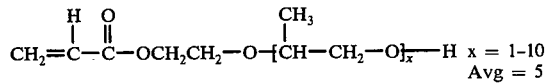

EXAMPLE 2

Preparation of A Water Soluble-Ultraviolet Curable Coating Containing a Copolymerizable Ketonic Sensitizer Charge a reaction flask fitted with a stirrer, condenser, thermometer, and nitrogen inlet with:
1. 406 grams HEA . 5 PO * (1.0 equivalent hydroxy of the product of Example 1)
2. 0.023 gram benzoquinone (polymerization inhibitor)
3. 25 grams benzophenone tetracarboxylic dianhydride (0.155 equivalence anhydride)
4. 92 grams pyromellitic dianhydride (0.845 equivalence anhydride)
5. 7.8 grams triethyl amine (about 1.5% by weight)

* The product having the formula presented in Example 1 in which X is an average of 5.

The mixture was heated at 70°–75° for 5 hours. After this time, the acid number was 122 (theoretical = 107). Infrared analysis showed a small amount of anhydride to still be present.

Then add slowly:
6. 61.6 grams dimethyl ethanol amine
7. 250 grams distilled water.

The product was a water solution having a solids content of 70% and a Gardner-Holdt viscosity of E-F (140–160 cps). The viscosity of the solution product was stable for over one week at room temperature.

The material was drawn down onto a metal substrate and cured by passing under two 200 watt per inch medium pressure mercury lamps at 10 feet per minute in an air atmosphere. The cured film was no longer water soluble and was dry and nontacky.

EXAMPLE 3

The preparation and curing procedure described in Example 2 was repeated except that dimethylamino ethyl acrylate was substituted in step 6. The cured film obtained was similar to that obtained in Example 2, but the unsaturated amine did not volatilize or extract as easily as the dimethyl ethanol amine of Example 2.

When the benzophenone tetracarboxylic dianhydride (component 3 in Example 2) is omitted, then the ultraviolet cure requires the external addition of a photosensitizer such as methyl or butyl benzoin ether, and these systems are significantly less stable.

I claim:
1. An ultraviolet curable aqueous coating solution comprising an hydroxy functional ethylenically unsaturated ultraviolet curable material reacted with a polycarboxylic acid or anhydride and dissolved in water with the aid of an amine photoinitiator, said ultraviolet curable material being monoethylenic or polyethylenic and monohydric or polyhydric and having a molecular weight providing a viscosity ranging from a fluid liquid to a viscous semi-solid, the proportion of said polycarboxylic acid or anhydride providing an acid number of from 20–300, and said amine providing a pH of from 6.0–11.0, said solution further containing a photosensitizer rendering the composition sensitive to ultraviolet light.

2. An ultraviolet curable aqueous coating solution as recited in claim 1 in which an hydroxy functional polyethylenically unsaturated material which is resinous is reacted with a polycarboxylic acid monoanhydride.

3. An ultraviolet curable aqueous coating solution as recited in claim 2 in which said resinous material is an epoxy resin diacrylate.

4. An ultraviolet curable aqueous coating solution as recited in claim 1 in which the hydroxy functional ethylenically unsaturated material is a monoacrylate and said polycarboxylic acid is a dianhydride.

5. An ultraviolet curable aqueous coating solution as recited in claim 4 in which said dianhydride is benzophenone tetracarboxylic dianhydride providing from 5%–40% of the anhydride functionality.

6. An ultraviolet curable aqueous coating solution as recited in claim 4 in which the unsaturation is acrylic.

7. An ultraviolet curable aqueous coating solution as recited in claim 1 in which said amine photoinitiator is ethylenically unsaturated.

8. An ultraviolet curable aqueous coating solution as recited in claim 7 in which said amine photoinitiator is dimethylamino ethyl acrylate.

9. An ultraviolet curable aqueous coating solution comprising the reaction product of an hydroxy acrylate with an approximately stoichiometric proportion of tetracarboxylic dianhydride consisting essentially of benzophenone tetracarboxylic acid dianhydride, said reaction product being dissolved in water with the aid of a tertiary amine photoinitiator.

10. An ultraviolet curable aqueous coating solution as recited in claim 9 in which said hydroxy acrylate is selected from hydroxy $C_2 - C_4$ alkyl acrylates and hydroxy ethers or esters thereof containing an average of from 2–10 ether or ester groups per molecule, and said reaction product is formed with a stoichiometric proportion of anhydride groups.

11. An ultraviolet curable addition reaction product of hydroxy $C_2 - C_4$ alkyl monoacrylate and hydroxy ethers or esters thereof, with an approximately stoichiometric proportion of tetracarboxylic acid dianhydride comprising benzophenone tetracarboxylic acid dianhydride providing from 5% to 40% of the anhydride functionality.

12. An ultraviolet curable addition product as recited in claim 11 neutralized with a tertiary amine.

* * * * *